United States Patent
Maruyama

(10) Patent No.: US 6,915,990 B2
(45) Date of Patent: Jul. 12, 2005

(54) PIPE HOLDING FASTENER

(75) Inventor: Toshio Maruyama, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/716,223

(22) Filed: Nov. 18, 2003

(65) Prior Publication Data

US 2004/0144897 A1 Jul. 29, 2004

Related U.S. Application Data

(63) Continuation of application No. PCT/US02/16658, filed on May 29, 2002.

(30) Foreign Application Priority Data

May 29, 2001 (JP) ........................................ 2001-160921

(51) Int. Cl.$^7$ ................................................ F16L 3/22
(52) U.S. Cl. ........................ 248/68.1; 248/62; 248/74.2
(58) Field of Search ........................... 248/62, 74.2, 49, 248/56, 65, 67, 67.7, 68.1, 71, 73; 24/555

(56) References Cited

U.S. PATENT DOCUMENTS

| | | | | |
|---|---|---|---|---|
| 5,033,701 A | * | 7/1991 | Kraus | ........................ 248/68.1 |
| 5,170,984 A | * | 12/1992 | Ruckwardt | ................... 248/635 |
| 5,458,303 A | | 10/1995 | Ruckwardt | |
| 5,588,683 A | * | 12/1996 | Schliessner | ................... 285/62 |
| 5,947,426 A | | 9/1999 | Kraus | |
| 6,036,145 A | * | 3/2000 | Calabrese et al. | ......... 248/68.1 |
| 6,070,836 A | * | 6/2000 | Battie et al. | ................ 248/68.1 |
| 6,206,330 B1 | * | 3/2001 | Oi et al. | ..................... 248/68.1 |
| 6,290,201 B1 | * | 9/2001 | Kanie et al. | ................. 248/636 |
| 6,450,459 B2 | * | 9/2002 | Nakanishi | ................... 248/68.1 |
| 6,585,196 B2 | * | 7/2003 | Nakanishi | ................... 248/68.1 |
| 6,708,931 B2 | * | 3/2004 | Miura | ....................... 248/68.1 |
| 6,708,933 B2 | * | 3/2004 | Girodo | ...................... 248/74.2 |

FOREIGN PATENT DOCUMENTS

| | | |
|---|---|---|
| DE | 85 292 669 | 1/1986 |
| EP | 0 683 343 A2 | 11/1995 |
| EP | 0 950 845 A2 | 10/1999 |
| GB | 2 154 648 A | 9/1985 |
| GB | 2 166 794 A | 5/1996 |
| JP | 09250517 A | 9/1997 |

* cited by examiner

*Primary Examiner*—Ramon O. Ramirez
*Assistant Examiner*—Amy J. Sterling
(74) *Attorney, Agent, or Firm*—Harness, Dickey & Pierce, P.L.C.

(57) ABSTRACT

A fastener for a pipe or the like, having a stud engagement portion through which an elongated article such as a pipe held by the fastener is mounted on a workpiece such as an automobile body. The fastener 1 comprises a base portion 6, and a support portion 14 for supporting a stud engagement portion 10. The support portion 14 is provided on the base portion outside the stud engagement portion 10. A thin connection portion 25 is provided between the support portion and the stud engagement portion in the vicinity of an inlet 15 of a stud receiving hole 11 of the stud engagement portion. The thin connection portion 25 is formed to connect the entire outer circumference of the stud engagement portion to the support portion. The stud engagement portion 10 is connected to the support portion 14 only by the thin connection portion 25.

13 Claims, 11 Drawing Sheets

PIPE HOLDING FASTENER

CROSS-REFERENCE TO RELATED APPLICATIONS

This application is a Continuation of International Application No. PCT/US02/16658, filed May 29, 2002 and designating the United States. This application claims the benefit of Japanese Application No. 2001-160921, filed May 29, 2001. The disclosure(s) of the above application(s) is (are) incorporated herein by reference.

FIELD OF THE INVENTION

The present invention relates to a fastener for mounting an elongated article such as a pipe or wire harness on a workpiece such as an automobile body. In particular, the present invention relates to a fastener for a pipe or the like, capable of being engaged with a stud standing on a workpiece such as an automobile body to mounting an elongated article such as a pipe held in a pipe holding portion of the fastener to the workpiece.

BACKGROUND OF THE INVENTION

In a support structure for attaching a long article such as a fuel pipe, brake oil pipe or wire harness of an automobile, it is desired to prevent vibration from being transmitted from the pipe or the like to an automobile body or the like or from the automobile body or the like to the pipe or the like. Heretofore, for the purpose of such vibration insulation, there has been typically employed a technique of attaching the pipe or the like to a fastener with winding a rubber vibration insulator around the pipe or the like. One such example includes a fastener for a pipe or the like described in Japanese Patent Laid-Open No. 9-250517. In this fastener, a vibration insulation characteristic is achieved by combining a flexible plastic material with a rigid plastic material. This technique is essentially required to use two kinds of plastic materials, resulting in increased cost and weight. Japanese Patent Laid-Open No. 7-310866 discloses a pipe fastener in which a flexible bridge member is provided between a stud engagement portion and a pipe holding portion to prevent vibration transmission between the stud engagement portion and the pipe holding portion. Japanese Patent Laid-Open No. 61-116189 also discloses a pipe fastener in which a flexible strip is provided between a stud engagement portion and pipe holding portion to prevent vibration transmission between the stud engagement portion and the pipe holding portion. These fasteners can be formed of a single plastic material, and thereby the problem of cost overrun would be solved. However, somewhat specified configuration of these fasteners can cause a problem of poor versatility, because their holding force is not sufficient to hold three or more of pipes or their molding process is complicated.

Japanese Patent Laid-Open Nos. 7-91570 and 9-126357 disclose a fastener for a pipe or the like, which includes a base portion, a pipe holding portion connected integrally with the base portion, and a stud engagement portion provided at the base portion and adapted to engage with a stud standing on a workpiece such as an automobile body, wherein engaging the stud engagement portion with the stud allows an elongated article such as a pipe held in the pipe holding portion to be mounted on the workpiece. This fastener is intended to reduce the number and total sectional area of connection portions between the stud engagement portion and the pipe holding portion to prevent vibration transmission between the stud engagement portion and the pipe holding portion.

The fastener in Japanese Patent Laid-Open Nos. 7-91570 and 9-126357 would provide a certain advantageous result in terms of preventing the vibration transmission between the stud engagement portion and the pipe holding portion. Further, the fastener could be formed in a suitable configuration for holding three or more of pipes. However, there is a problem of slightly low strength in the connection portions between the stud engagement portion and the pipe holding portion, because it is too enhanced to prevent the vibration transmission between the stud engagement portion and the pipe holding portion.

Therefore, in a fastener for a pipe or the like, having a stud engagement portion through which an elongated article such as a pipe held by the fastener is mounted on a workpiece such as an automobile body, it is an object of the present invention to enable the fastener to maintain high connection strength between the stud engagement portion and a pipe holding portion of the fastener while keeping a sufficient isolating property for vibration transmitted from the pipe or the like to the car body (or vise versa).

SUMMARY OF THE INVENTION

In order to achieve the above object, the present invention provides a fastener for a pipe or the like, comprising a base portion, a pipe holding portion connected integrally with the base portion, and a stud engagement portion disposed in the base portion and adapted to engage with a stud standing on a workpiece such as an automobile body, wherein engaging of the stud engagement portion with the stud allows an elongated article such as a pipe held in the pipe holding portion to be mounted on the workpiece. This fastener further comprises: a support portion formed on the base portion and outside the stud engagement portion for supporting the stud engagement portion; and a thin connection portion disposed between the support portion and the stud engagement portion to connect them with each other in the vicinity of an inlet of a stud receiving hole formed in the stud engagement portion, the thin connection portion being formed to connect, to the support portion, the entire outer circumference of the stud engagement portion adjacent to the inlet, whereby the stud engagement portion is connected to the support portion by only the thin connection portion. As above, the entire outer circumference of the stud engagement portion adjacent to the inlet is connected to the support portion in the base portion through the thin connection portion, so that the stud engagement portion is connected to the support portion only by the thin connection portion. Thus, the fastener can achieve and maintain a high connection strength between the stud engagement portion and the pipe holding portion while keeping a sufficient isolating property or characteristic of vibration transmitted from a pipe or the like to an automobile body (or vise versa).

In a preferred embodiment of the present invention, the stud engagement portion preferably includes a pair of opposed side walls each extending from the inlet in an insertion direction of the stud, and a bottom wall connecting the respective ends of the side walls with each other, and the support portion includes a pair of opposed side walls outside the side walls of the stud engagement portion to surround the stud engagement portion, and a bottom wall apart from and outside the bottom wall of the stud engagement portion, and the bottom walls of the stud engagement portion and the support portion preferably include a combination of a hole and a protrusion to be received in the hole, the combination serving to restrict the movement of the stud engagement portion relative to the support portion in a predetermined range. In its fastener, the bottom wall of the support portion may be formed with a panel engagement portion on the side opposite to the stud engagement portion. The stud engagement portion may be formed with a stopper for preventing the support portion from moving in the direction of getting out of the stud up to the extent of causing the destruction of the thin connection portion.

Further, the present invention provides a fastener for a pipe or the like, comprising a base portion, a pipe holding portion connected integrally with the base portion, and a stud engagement portion provided at the base portion and adapted to engage with a stud standing on a workpiece such as an automobile body, wherein engaging of the stud engagement portion with the stud allows an elongated article such as a pipe held in the pipe holding portion to be mounted on the workpiece. The fastener further comprises: a support portion formed on the base portion and outside the stud engagement portion for supporting the stud engagement portion; a thin connection portion disposed between the support portion and the stud engagement portion to connect them with each other in the vicinity of an inlet of a stud receiving hole formed in the stud engagement portion, the thin connection portion being formed to connect, to the support portion, the entire outer circumference of the stud engagement portion adjacent to the inlet; and a connection piece provided between the support portion and the stud engagement portion to connect them with each other at a small area in a position extending from the inlet in a stud insertion direction, whereby the stud engagement portion is connected to the support portion by only both the thin connection portion and the connection piece. As above, the entire outer circumference of the stud engagement portion adjacent to the inlet is connected to the support portion of the base portion by the thin connection portion, and the other end of the stud engagement portion is connected to the support portion at a small area through the connection piece, so that the stud engagement portion is connected to the support portion only by the thin connection portion and the connection piece. Thus, the fastener can achieve and maintain enhanced high connection strength between the stud engagement portion and the pipe holding portion while keeping a sufficient isolating property of vibration transmitted from a pipe or the like to an automobile body (or vise versa).

In the above fastener, the stud engagement portion may include a pair of opposed side walls each extending from the inlet in the stud insertion direction, and a bottom wall connecting the respective ends of the side walls with each other, and the support portion includes a pair of opposed side walls outside the side walls of the stud engagement portion to surround the stud engagement portion, and a bottom wall apart from and outside the bottom wall of the stud engagement portion, and wherein the connection piece connects the respective central regions of the bottom walls of the stud engagement portion and the support-portion with each other. In that fastener, the bottom wall of the stud engagement portion is preferably formed in a thin walled structure. In that fastener, the wall of the support portion may be formed with a panel engagement portion on the side opposite to the stud engagement portion. Further, the stud engagement portion may be formed with a stopper for preventing the support portion from moving in the direction of getting out of the stud up to the extent of causing the destruction of the thin connection portion.

DETAILED DESCRIPTION OF THE PREFERRED EMBODIMENT

Figure 1:
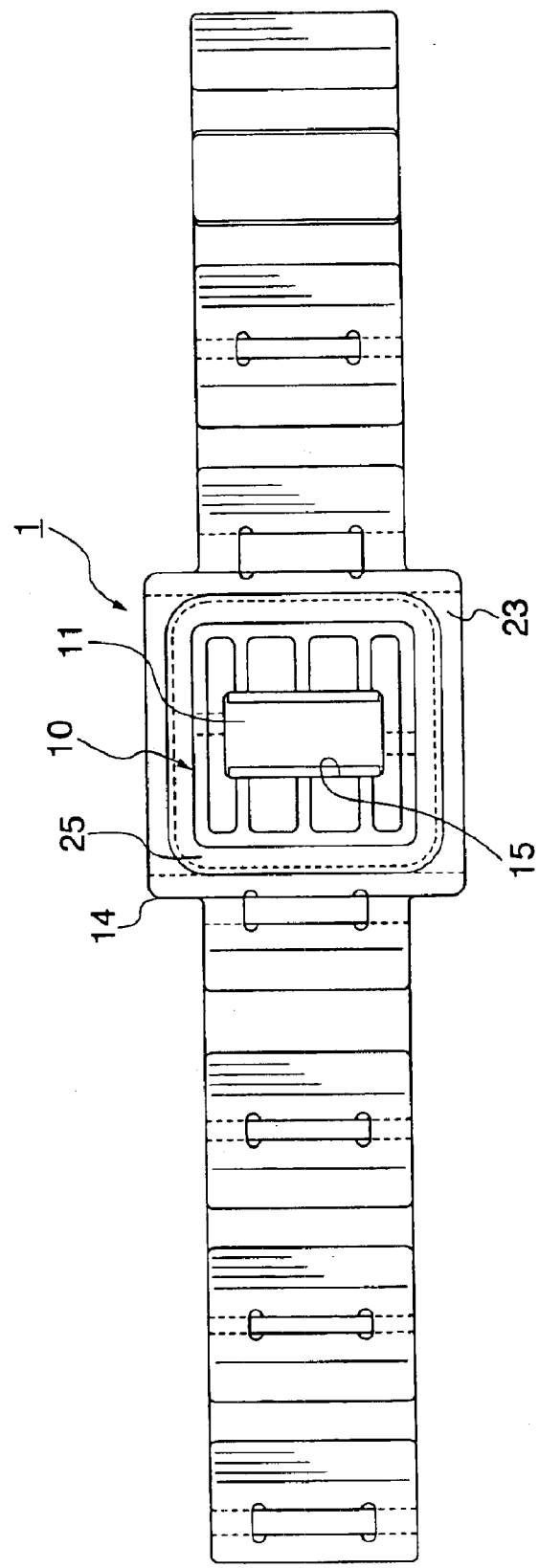
FIG. 1 is a top plan view of a fastener for a pipe or the like, according to a first embodiment of the present invention.
Figure 2:
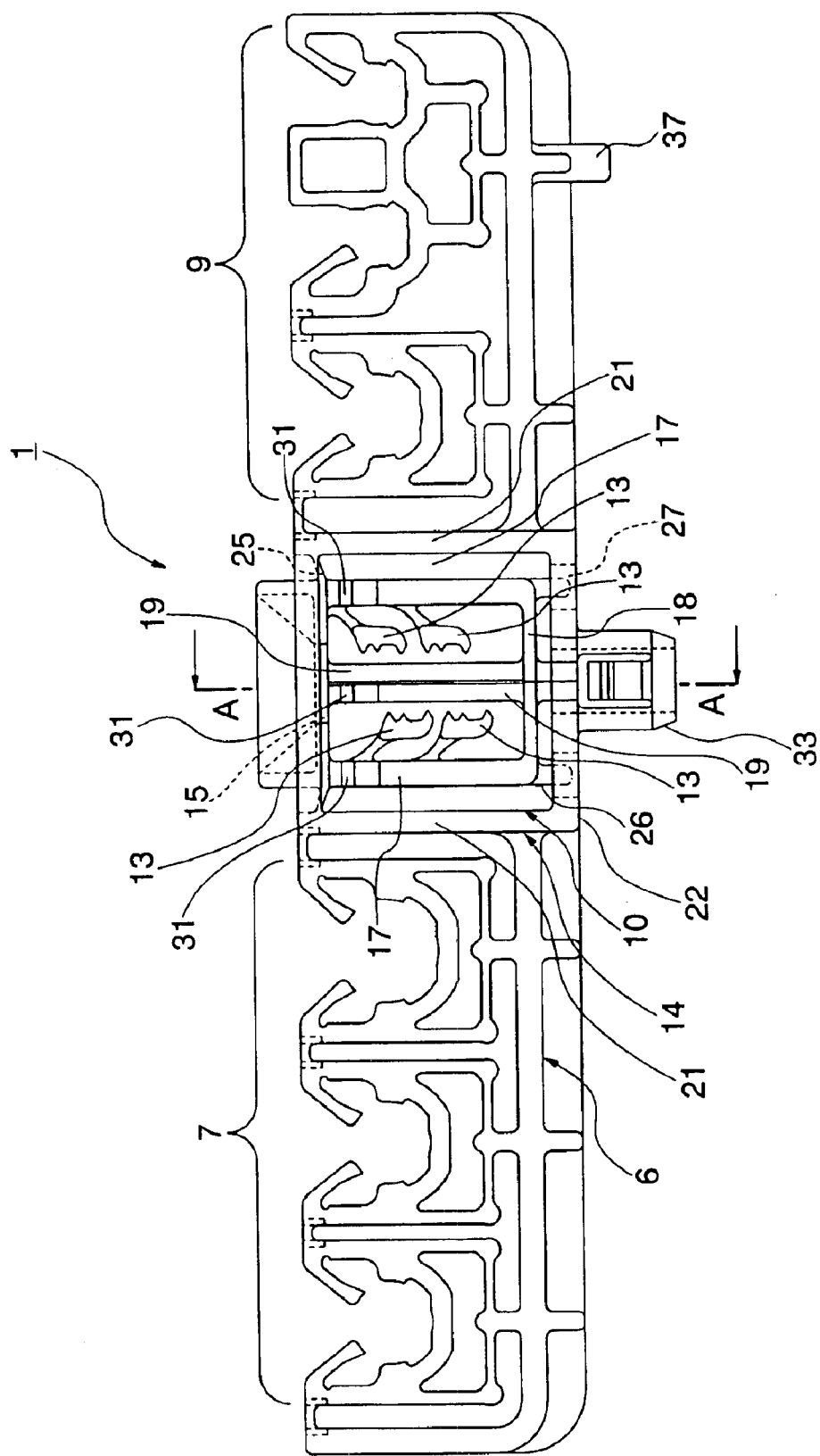
FIG. 2 is a front view of the fastener of FIG. 1.
Figure 3:
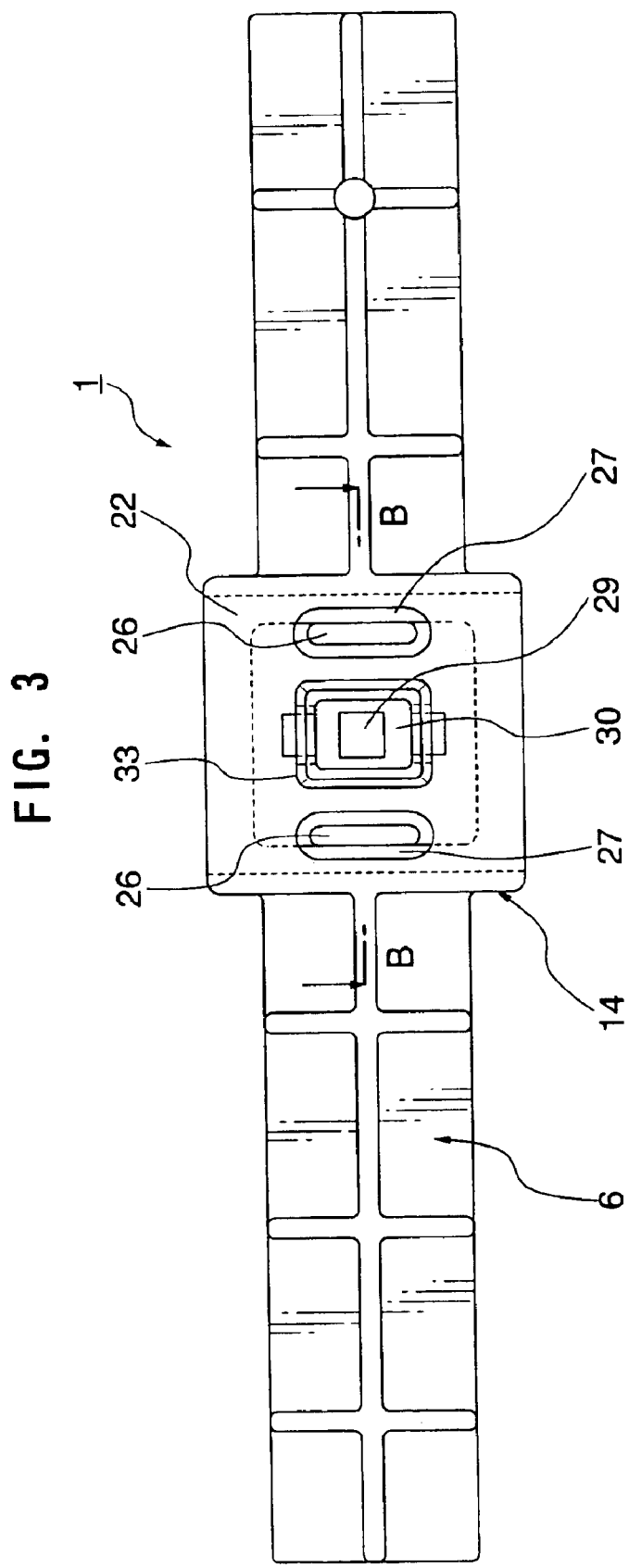
FIG. 3 is a bottom view of the fastener of FIG. 1.
Figure 4:
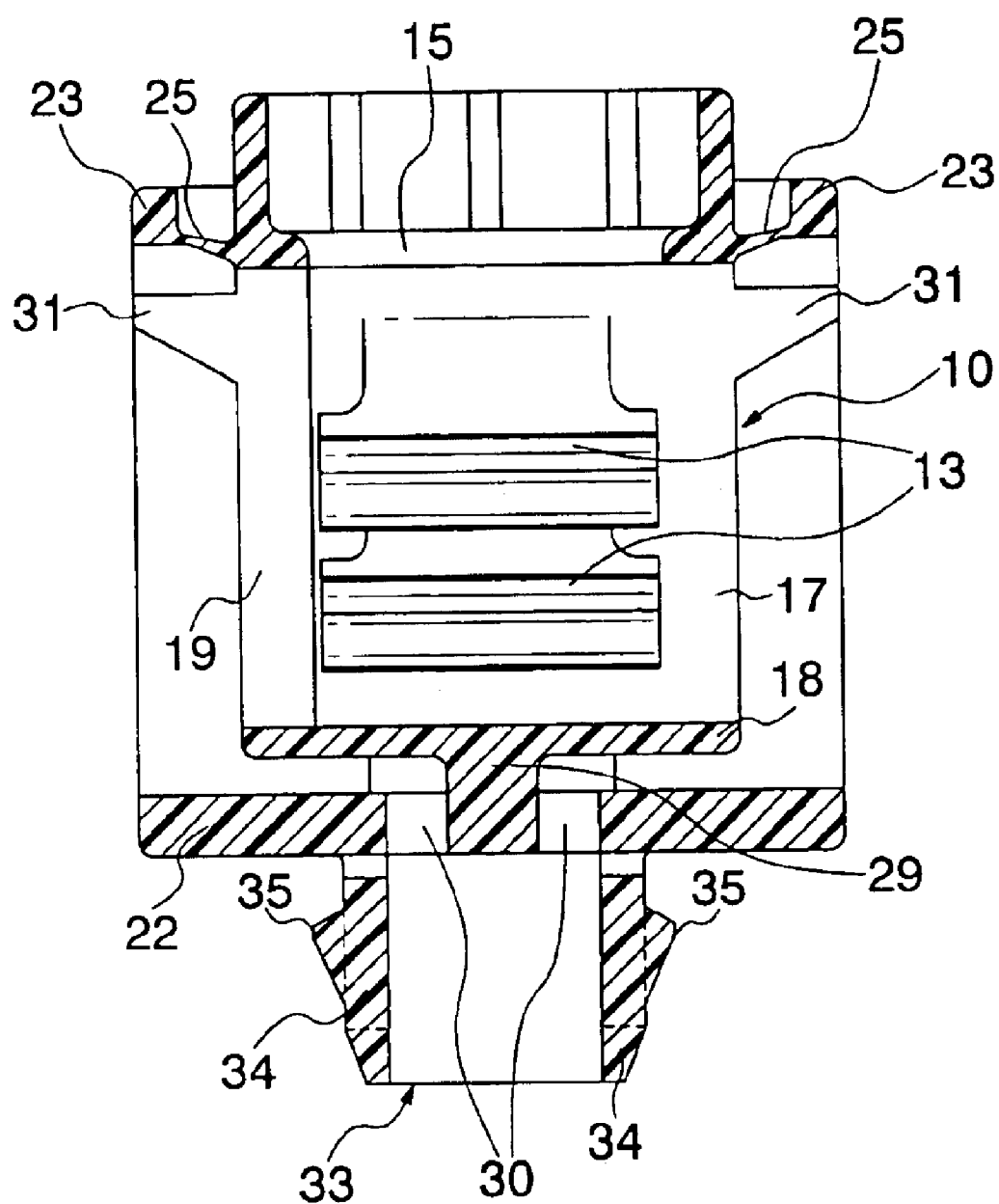
FIG. 4 is a sectional view of the fastener taken along the line A—A of FIG. 2.
Figure 5:
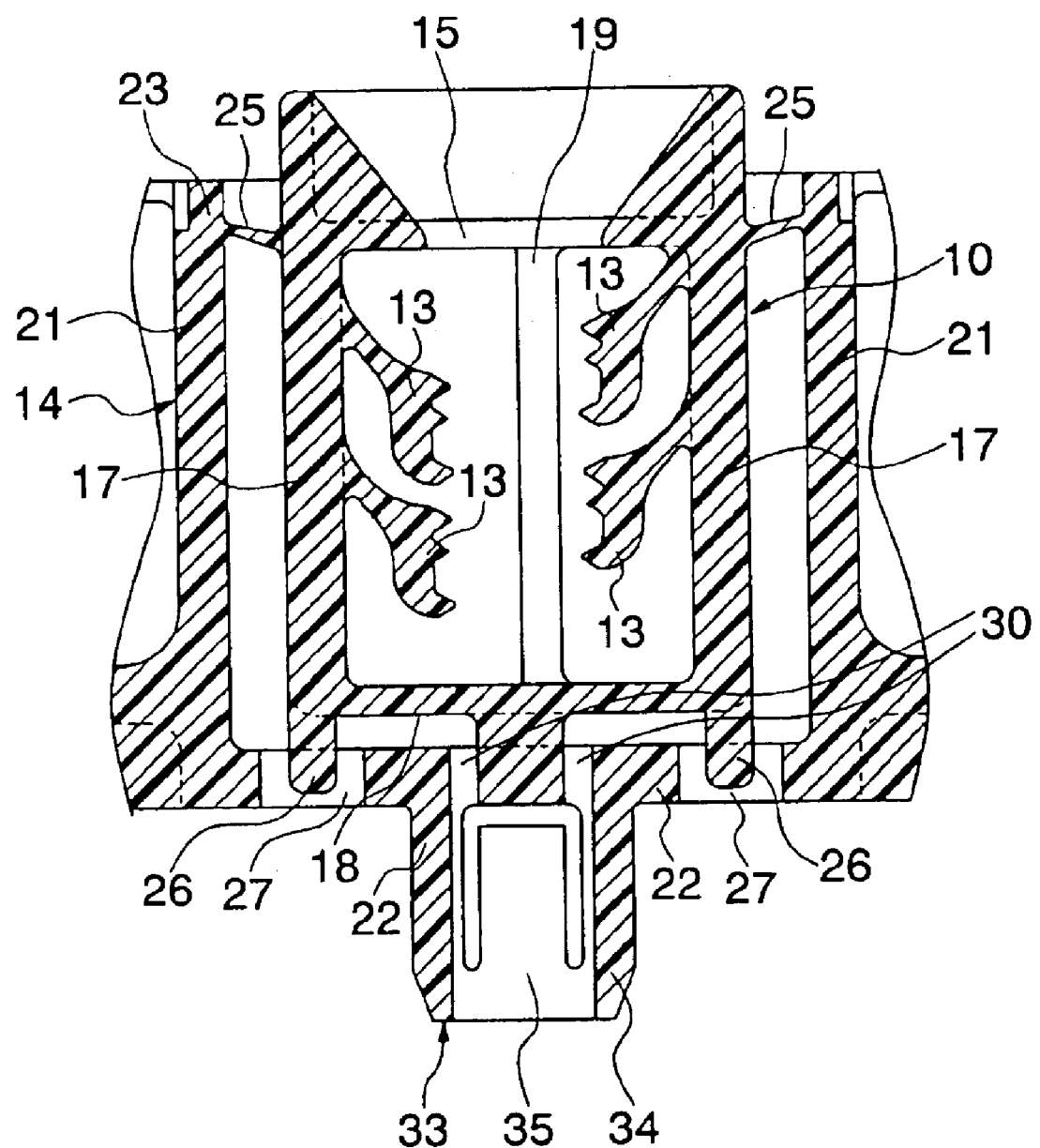
FIG. 5 is a sectional view of the fastener taken along the line B—B of FIG. 3.
Figure 6:
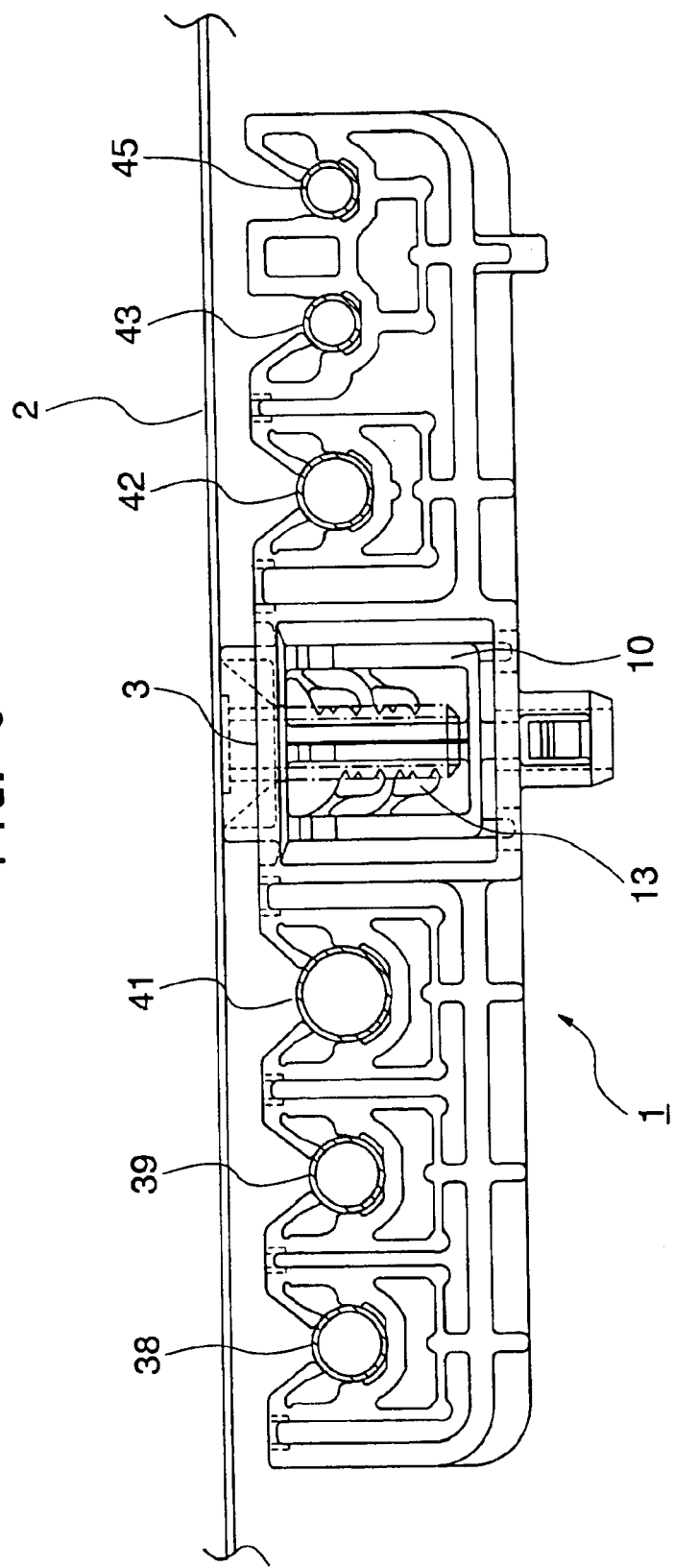
FIG. 6 is a view showing the state that a plurality of pipes are mounted on a body panel by using the fastener of FIG. 1.
Figure 7:
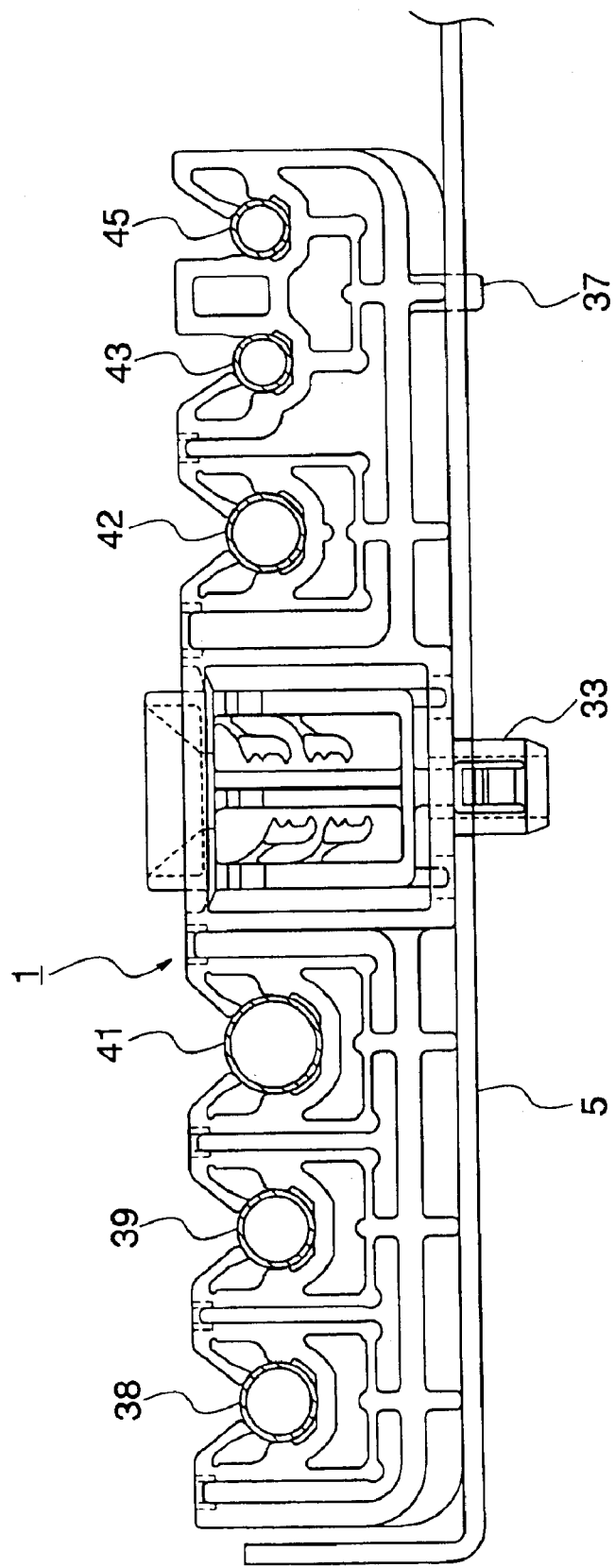
FIG. 7 is a view showing the state that a plurality of pipes are mounted on another panel by using the fastener of FIG. 1.

With reference to the drawings, embodiments of the present invention will now be described. FIGS. 1 to 7 show a fastener 1 for a pipe or the like, according a first embodiment of the present invention. FIGS. 1, 2 and 3 are a top plan view, front view and bottom view of the fastener 1, respectively. FIG. 4 is a sectional view taken along the line A—A of FIG. 2, and FIG. 5 is a sectional view taken along the line B—B of FIG. 3. FIG. 6 shows the state that the fastener 1 is engaged with a stud 3 standing on a body panel 2 of an automobile body or the like as a workpiece to mount various pipes on the workpiece. FIG. 7 shows the state that the fastener 1 is mounted on another panel 5 different from the body panel 2 by using a panel engagement portion formed in the fastener 1. The fastener 1 for a pipe or the like according to the present invention is made in a one-piece component of plastic material. As shown in FIGS. 1 to 3, the fastener 1 comprises a base portion 6 and pipe holding portions 7, 9 connected integrally with the base portion 22. The base portion 6 is formed in an elongated configuration for allowing each of the pipe holding portions to hold a plurality of pipes in parallel. A stud engagement portion 10 is disposed in the center region of the base portion to engage with the stud. The pipe holding portion 7 is formed to hold, for example, three fuel oil pipes, and the pipe holding portion 9 is formed to hold, for example, one fuel pipe and two brake oil pipes. Each pipe receiving portion of these pipe holding portions 7, 9 is formed in a configuration allowing a pipe to be pushed thereinto and held therewithin. Each of the pipe holding portions 7, 9 is also formed in a configuration allowing the connection portion to the base portion 6 to be minimized in size so as to prevent vibration from being transmitted to the base portion 6. For example, a plurality of the fastener 1 are attached, respectively, to a plurality of positions of a long pipe, and are then attached, respectively, to a plurality of the studs at separate predetermined positions of the body panel.

The stud engagement portion 10 has a stud receiving hole 11 for receiving the stud 3 (FIG. 3). The stud receiving hole 11 is formed lengthwise in a direction parallel to the longitudinal direction of the pipes (the vertical direction in FIG. 1) held in the pipe holding portions. The stud engagement portion 10 is formed with a plurality of engagement pawls 13 each adapted to engage with threads or grooves of the stud. Each of the engagement pawls 13 is formed in a plate member extending in a direction parallel to the longitudinal direction of the stud receiving hole 11, and these plate engagement pawls 13 makes two pairs each disposed on both sides of the stud receiving hole 11. In this manner, the stud receiving hole 11 is formed in an elongated hole, and each of the engagement pawls 13 is formed lengthwise in the longitudinal direction of the elongated hole. Thus, even if each position of the plurality of fasteners 1 attached to the pipes is shifted from the position of the corresponding stud of the body panel, each of the fasteners can cope with the deviance to adjust the attaching position adequately. For a threaded stud, the engagement pawls are offset in the height direction of the fastener (the vertical direction in FIG. 2) in accordance with the thread pitch of the stud. This provides secure engagement force to the threads of the stud.

In the present invention, the base portion 6 is formed with support portions 14 outside the stud engagement portion 10 for supporting the stud engagement portion 10. The support portions 14 are formed to have high rigidity for elongated portions supporting the pipe holding portions 7, 9 to define a main body of the base portion 6. The stud engagement portion 10 supported by the support portion 14 includes a pair of opposed side walls 17 each extending from an inlet 15 (see FIGS. 2, 4 and 5) of the stud receiving hole 11 in an insertion direction of the stud (the downward direction in FIGS. 2 and 4), and a bottom wall 18 connecting the respective ends (the lower ends in FIGS. 2 and 4) of the side walls with each other. Each of the side walls 17, 17 is disposed to face with the corresponding one of the pipe holding portions 7, 9, whereas no wall is provided on other sides (the front and back sides in FIG. 2) to make a cavity. This configuration allows the pipe holding portions and the engagement pawls 13 to be formed by using a two-piece split mold or die. In order to prevent degradation in strength due to this cavity, columns or posts 19 are formed in the central region of the cavity. The columns 19 are provided on the front and back sides, respectively, and the front side column 19 is offset to the back side column 19 in the horizontal direction in FIG. 2 for the purposed of the forming through the two-piece split mold. The support portion 14 is formed to support the stud engagement portion 10 having the above configuration, from the outer side of the stud engagement portion 10. The bottom 18 wall has a thickness less than each of the side walls 17.

The support portion 14 includes a pair of opposed side walls 21, 21 disposed outside the side walls 17 of the stud engagement portion 10 and apart from the side walls 17 of the stud engagement portion to surround the stud engagement portion 10. The support portion 14 also includes a bottom wall 22 disposed outside the stud engagement portion bottom wall 18 and apart from the stud engagement portion bottom wall 18. The upper region 23 (see FIG. 1) of the support portion 14 is formed in a square ring shape to surround the inlet 15 facing to the upper region of the stud engagement portion 10. A thin connection portion 25 is provided between the support portion 14 and the stud engagement portion 10 to connect them with each other in the vicinity of the inlet 15 of the stud receiving hole 11. The thin connection portion 25 is formed to connect the entire outer circumference of the stud engagement portion 10 adjacent to the inlet 15 to the upper region 25 of support portion 14. This provides and maintains high connection strength between the stud engagement portion 10 and the support portion 14. In the fastener 1 according to the first embodiment, the stud engagement portion 10 is connected to the support portion 14 only by the thin connection portion 25. Thus, even if the vibration is transmitted from the pipe holding portions 7, 9 to the support portion 14 of the base portion 6, the vibration is transmitted to the stud engagement portion 10 through only the thin connection portion 25 but not transmitted through the other portions. Further, the thin connection portion is formed in a thin structure to enhance the effect of preventing vibration transmission. This sufficiently prevents the vibration from being transmitted from the support portion 14 to the stud engagement portion 10, and allows vibration insulating characteristic or property to be kept at a high insulation level. Similarly, the vibration is not transmitted from the stud engagement portion 10 to the support portion 14. This also allows the characteristic of insulating vibration to the pipe holding portions 7, 9 to be kept at a high insulation level. In addition, the thin connection portion 25 over the entire circumference of the stud engagement portion 10 provides and maintains a high connection strength.

Since the thin connection portion 25 is disposed in the vicinity of the inlet 15 of the stud receiving hole 11 in the stud engagement portion 10, the region around the bottom wall 18 of the stud engagement portion 10 could swing about the thin connection portion 25 as a hinge. In order to deal with this issue, the bottom wall 18 of the stud engagement portion 10 and the support portion bottom wall 22 include a combination of a hole and a protrusion to be received in the hole, to restrict the movement of the stud engagement portion 10 to the support portion 14 in a predetermined range. In the illustrated embodiment, the stud engagement portion bottom wall 18 is formed with a pair of protrusions 26 each protruding downward at a position close to the corresponding one of the pipe holding portions 7, 9, and the support portion bottom wall 22 is formed with a pair of holes 27 each receiving the corresponding one of the protrusions. FIGS. 2, 3 and 5 will be referred. As shown in FIG. 3, each of the protrusions 26 is formed in an elongated configuration extending in the longitudinal direction of each pipe held in the pipe holding portion, and each of the hole 27 is formed in a predetermined size to receive the corresponding protrusion therein and to allow the stud engagement portion bottom wall 18 to slightly move while restricting this movement so as not to go beyond a predetermined range. Further, a prismatic (or square post) protrusion 29 is formed at the central region of the stud engagement portion bottom wall 18, and a hole 30 receiving the protrusion 29 therein is formed at the central region of the bottom wall of the support portion. This restricts the movement of the stud engagement portion 10 to the support portion 14 in a predetermined range. However, any other suitable combination for restricting the movement of the stud engagement portion 10 to the support portion 14 in a predetermined range can be used, and these protrusions and holes may be provided in the reverse relationship to the stud engagement portion bottom wall 18 and the support portion bottom wall 22.

Each of the stud engagement portion side walls 17 and the columns 19 is formed with stoppers 31 for restricting the movement of the support portion 14 in the direction of getting out of the stud to prevent the support portion from excessively moving downward. In FIGS. 2 and 4, when a strong downward force is applied to the base portion 6 due to an external force to the pipes etc, the support portion 14 simultaneously moves downward or in the direction of getting out of the stud. By this downward movement, the region of the thin connection portion 25 close to the support portion 14 is dragged downward. On the other hand, the stud engagement portion 10 stands against the downward movement because it is engaging with the stud on the body panel.

Thus, only the region of the thin connection portion 25 close to the support portion 14 could be dragged downward, resulting in breaking or rupture of the thin connection portion 25. The stopper 31 prevents the support portion 14 from moving downward with respect to the stud engagement portion or in the direction of getting out of the stud to the extent of causing the destruction of the thin connection portion 25. More specifically, the triangular stoppers 31 are provided on each of both the front and back sides of each of the side walls of the stud engagement portion and the columns 19, protruding to a position immediately below the upper region 23 of the support portion 14. By virtue these stoppers 31, even if the main body of the base portion 6 including the support portion 14 is applied with an excessive force in the direction of getting away from the body panel along the axis of the stud, the support portion 14 is brought into contact with the stoppers 31 and thereby cannot move with respect to the stud engagement portion 10 any more. This restricts the movement of the support portion 14 in a constant range so as to prevent any destruction or breaking of the thin connection portion 25.

In the fastener 1, the support portion bottom wall 22 is provided with a panel engagement portion 33 protruding from the central region thereof toward the opposite side of the stud engagement portion bottom wall 18. The panel engagement portion 33 includes a square tubular body 34, and a pair of engagement pawls 35 resiliently protruding from the opposite sides of the body. The panel engagement portion 33 can be used to mount the fastener 1 on a panel as another component having a mounting hole therein, which is provided in addition to the automobile body panel having the stud standing thereon. For example, if the fastener 1 having the pipes attached thereto is mounted on the panel and then the fastener 1 is mounted on the car body panel by engaging the stud engagement portion with the stud, the panel can be mounted on the body panel as well as the pipes. Further, a pin-shaped protrusion 37 is provided on the under surface of the base portion 6 in a position extending toward the pipe holding portion 9. The pin-shaped protrusion 37 prevents the fastener 1 from rotating with respect to the panel about the panel engagement portion 33.

FIG. 6 shows the state that a plurality of pipes are mounted on the body panel 2 or a workpiece by using the fastener 1. Four fuel pipes 38, 39, 41, 42 (the pipe 41 has a larger diameter in the illustrated example) and two brake oil pipes 43, 45 (each of these pipes has a smaller diameter than those of the fuel pipes) are held by the pipe holding portions 7, 9. The stud 3 is inserted into the stud engagement portion 10, and the engagement pawls 13 engage with the threads or grooves of the stud 3. In this manner, the pipes 38, 39, 41, 42, 43, 45 are mounted on the body panel 2. The entire outer circumference of the stud engagement portion 10 is connected to the support portion 14 in the vicinity of the inlet 15 through the thin connection portion 25, so that the stud engagement portion 10 is connected to the support portion 14 only by the thin connection portion 25. This provides enhanced insulating characteristic of vibration transmitted from the pipes or the like to the automobile body or the like (or vise versa), and also provides and maintains the high connection strength between the stud engagement portion 10 and the support portion 14 (accordingly, the pipe holding portions 7, 9). FIG. 7 shows the state that the fastener 1 is mounted on the panel 5 which is different from the body panel 2, by using the panel engagement portion 33. The panel engagement portion 33 is inserted into the mounting hole of the panel 5, and the protrusion 37 of the base portion 6 is inserted into a corresponding hole of the panel 5, so that the fastener 1 is fixed to the panel 5 and the pipes 38, 39, 41, 42, 43, 45 are mounted on the panel 5.

Figure 8:
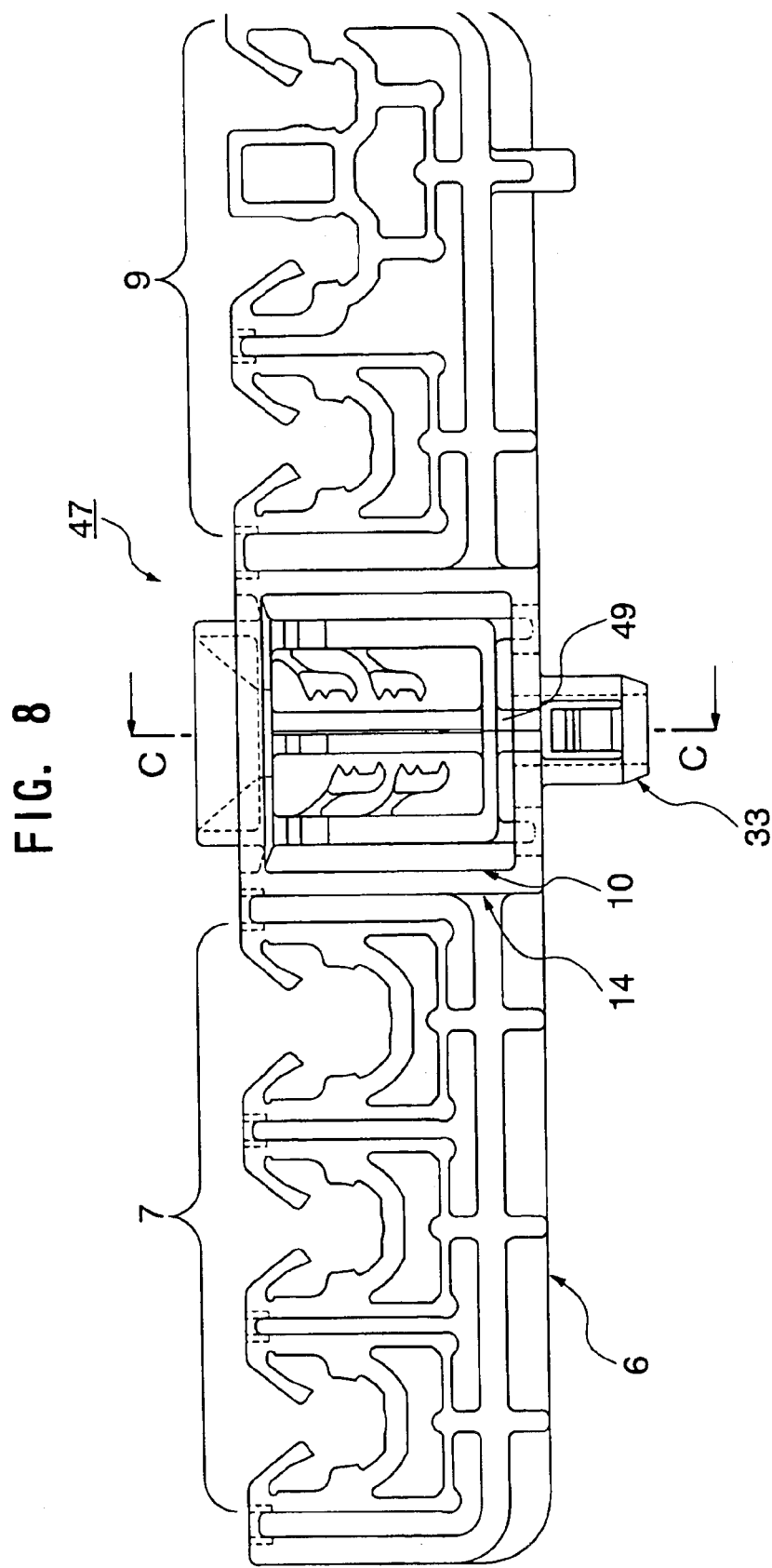
FIG. 8 is a front view of a fastener for a pipe or the like, according to a second embodiment of the present invention.

FIGS. 8 to 11 show a fastener 47 for a pipe or the like, according to a second embodiment of the present invention. FIG. 8 is a front view of the fastener 47, FIG. 9 being a bottom view of the fastener 47, FIG. 10 being a sectional view taken along the line C—C of FIG. 8, and FIG. 11 being a sectional view taken along the line D—D of FIG. 9. As can be seen from these figures, the fastener 47 is almost the same as the fastener 1 of the first embodiment. The fastener 47 is different from the fastener 1 in that a bottom wall 22 of a support portion 14 and a bottom wall 18 of a stud engagement portion 10 are connected with each other at a small area through a pin-shaped connection piece 49 provided at the respective central regions of both the bottom walls, so that the stud engagement portion 10 is connected to the support portion 14 by and only by the thin connection portion 25 and the connection piece 49. Since other elements or components are the same as those of the fastener 1, the corresponding components of the fastener 47 in FIGS. 8 to 11 are defined by the same reference numerals as those of the fastener 1, and their description will be omitted.

Figure 9:
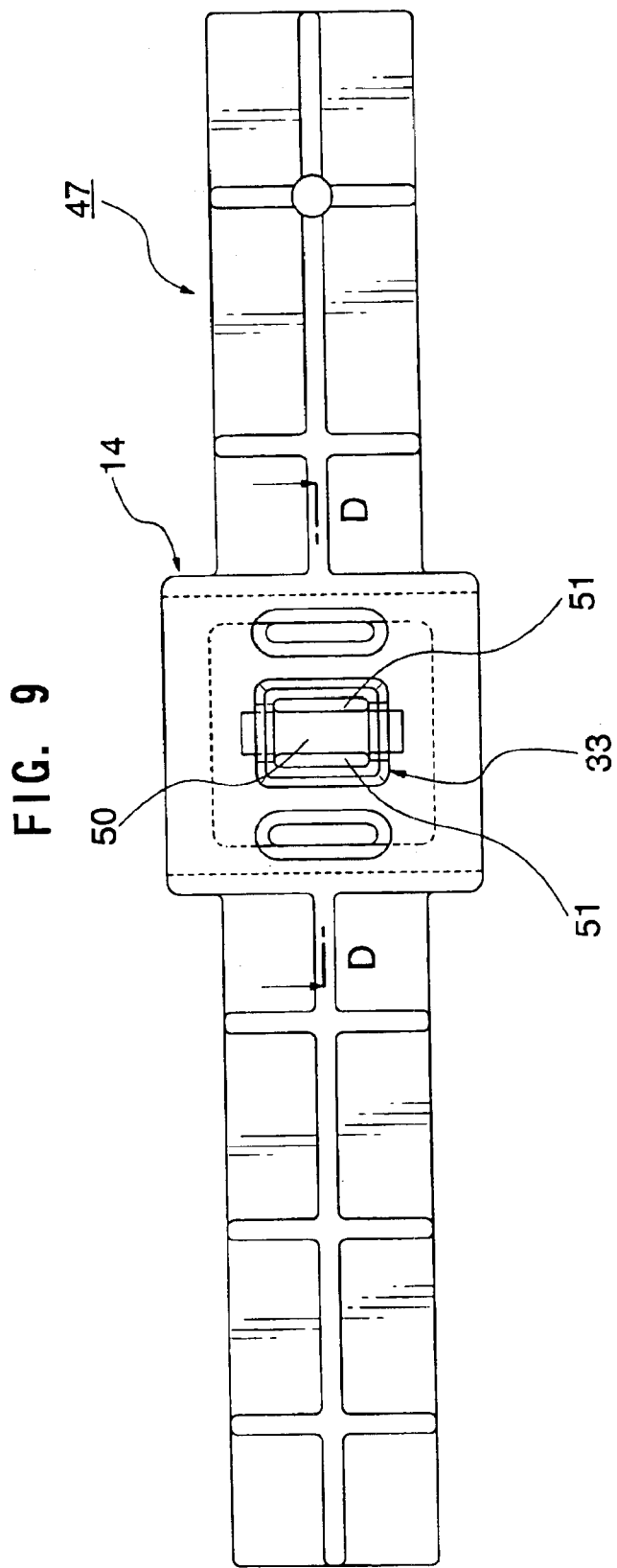
FIG. 9 is a bottom view of the fastener of FIG. 8.
Figure 10:
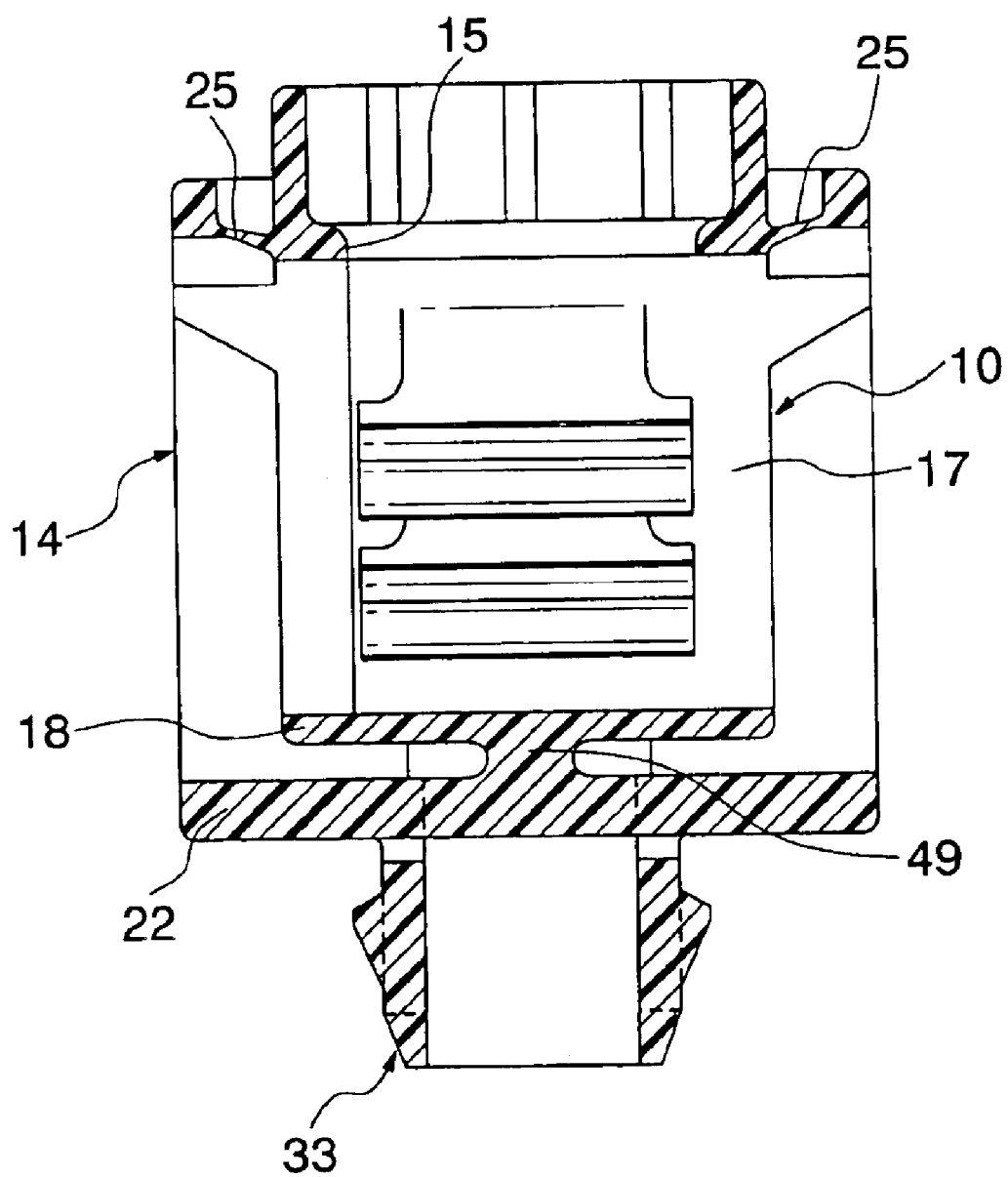
FIG. 10 is a sectional view of the fastener taken along the line C—C of FIG. 8.
Figure 11:
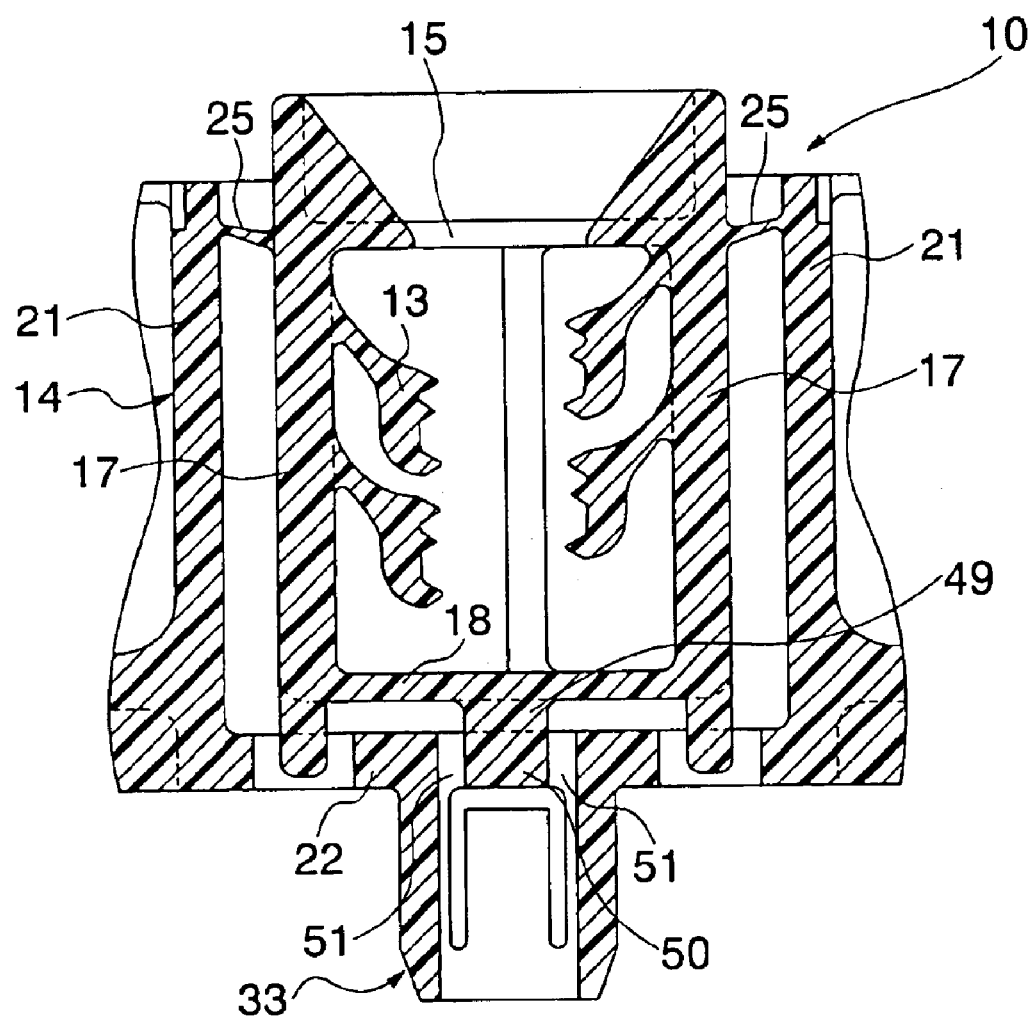
FIG. 11 is a sectional view of the fastener taken along the line D—D of FIG. 9.

The connection piece 49 connects the respective central regions of the stud engagement portion bottom wall 18 and the support portion bottom wall 22 in a position extending from an inlet 15 of the stud engagement portion 10 in the stud insertion direction, by a small sectional area. Further, in the connection region 50 of the support portion bottom wall 22 to which the connection piece is connected, a pair of slits 51, 51 are formed on both sides of the connection piece 49, as shown in FIGS. 9 and 11. In addition, the bottom wall 18 of the stud engagement portion 10 is formed in a thin structure. The connection piece 49 can restrain vibration transmission because it is formed in a pin shape having a small sectional area. This vibration transmission is further reduced because the connection region of the bottom wall of the support portion is formed with the pair of slits on both sides of the connection piece. In addition, the stud engagement portion bottom wall 18 formed in a thin structure enhances the vibration insulating characteristic. The fastener 47 according to the second embodiment can achieve and maintain additionally high connection strength between the stud engagement portion and the pipe holding portion while keeping sufficient isolating characteristic of vibration transmitted from the pipe or the like to the automobile body (or vise versa). In the support portion bottom wall 22 of the fastener 47, the panel engagement portion 33 is also provided on the opposite side of the stud engagement portion 10.

According to the fastener for a pipe or the like, according to the present invention, the entire outer circumference of the stud engagement potion is connected to the support portion of the base portion in the vicinity of the inlet through the thin connection portion, so that the stud engagement portion is connected to the support portion only by the thin connection portion. Thus, the fastener can achieve and maintain high connection strength between the stud engagement portion and the pipe holding portion while keeping a high isolating characteristic of vibration transmitted from the pipe or the like to the automobile body (or vise versa).

In the other fastener wherein the entire outer circumference of the stud engagement potion adjacent to the inlet is connected to the support portion of the base portion through the thin connection portion and the other end of the stud engagement potion is connected to the support portion at a small area through the connection piece to connect the stud engagement portion with the support portion by only both the thin connection portion and the connection piece, the fastener can achieve and maintain an enhanced high connection strength between the stud engagement portion and the pipe holding portion while keeping the high isolating characteristic of vibration transmitted from the pipe or the like to the automobile body (or vise versa).

I claim:

1. A fastener adaptable for engagement with a pipe, comprising:

a base portion;

a pipe holding portion connected integrally with said base portion;

a stud engagement portion provided at said base portion and adapted to engage with a stud standing on a workpiece such as an automobile body, wherein engagement of said stud engagement portion with said stud allows an elongated article such as a pipe held in said pipe holding portion to be mounted on said workpiece;

a support portion integrally formed with said base portion and outside said stud engagement portion for supporting said stud engagement portion;

a connection portion disposed between said support portion and said stud engagement portion to connect them with each other in the vicinity of an inlet of a stud receiving hole formed in said stud engagement portion, said connection portion being formed to, continuously connect, to said support portion, the entire outer circumference of said stud engagement portion adjacent to said inlet; and a connection piece provided between said support portion and said stud engagement portion to connect them with each other at an area in a position extending from said inlet in a stud insertion direction, whereby said stud engagement portion is connected to said support portion by only both said connection portion and said connection piece.

2. The fastener as defined in claim 1, wherein said stud engagement portion includes a pair of opposed side walls each extending from said inlet in the stud insertion direction, and a bottom wall connecting a respective end of each of said side walls with each other, and said support portion includes a pair of opposed side walls outside the side walls of said stud engagement portion to surround said stud engagement portion, and a bottom wall spaced apart from and outside the bottom wall of said stud engagement portion, and wherein said connection piece connects the respective central regions of the bottom walls of said stud engagement portion and said support-portion with each other.

3. The fastener as defined in claim 2, wherein a thickness of the bottom wall of said stud engagement portion is less than a thickness of each of the side walls.

4. The fastener as defined in claim 2, wherein said wall of said support portion further comprises a panel engagement portion on a side opposite to said stud engagement portion.

5. The fastener as defined in claim 1, wherein said stud engagement portion further comprises a stopper for preventing said support portion from moving in a direction of release from said stud.

6. The fastener of claim 1, wherein said stud engagement portion further comprises a plurality of engagement pawls configurable to engage said stud.

7. The fastener of claim 6, wherein said engagement pawls further comprise two pairs of opposed engagement pawls.

8. The fastener of claim 7, wherein said engagement pawls of a first one of said pairs are offset from said engagement pawls of a second one of said pairs in a height direction of said fastener to operably engage a thread pitch of said fastener.

9. A fastener adaptable for engagement with at least one pipe, the fastener comprising:

a base having first and second pipe holding members integrally connected to the base and a male panel engagement member integrally connected to the base and facing oppositely from the first and second pipe holding members;

a support member integrally connected to the base between the first and second pipe holding members;

a stud engagement member positioned within the support member and integrally connected to the support member, the stud engagement member adapted to engage with a stud extending from a workpiece;

a connection portion continuously surrounding the stud engagement member and operable to integrally join the stud engagement member to the support member adjacent to an inlet of the stud engagement member;

a wall of the stud engagement member positioned opposite from the inlet having a connection piece operable to integrally connect the wall to the support member; and a connection region of the connection piece at least partially positioned in an aperture created in the panel engagement member;

wherein the stud engagement member is connected to the support member only by the connection portion and the connection piece.

10. The fastener of claim 9, further comprising a plurality of engagement pawls arranged as substantially opposed pairs of engagement pawls, the pawls of each pair offset from each other in a height direction of the fastener to operably engage a thread pitch of the fastener.

11. The fastener of claim 9, wherein the stud engagement member further comprises a pair of protrusions each freely positioned within one of a pair of apertures in the support member, the apertures operably allowing limited motion of the stud engagement member.

12. The fastener of claim 9, wherein the stud engagement member further comprises:

a pair of opposed side walls; and a pair of opposed columns disposed between the opposed side walls.

13. The fastener of claim 12, wherein each of the side walls and the columns further include at least one stopper, wherein the stopper operably limits a displacement of the support member with respect to the stud engagement member.

* * * * *